United States Patent
Straub et al.

(10) Patent No.: US 7,434,671 B2
(45) Date of Patent: Oct. 14, 2008

(54) OVERRUNNING CLUTCH

(75) Inventors: Frank Straub, Hohenroth (DE); Martin Halama, Weisendorf (DE); Frieder Altmann, Pommersfelden (DE)

(73) Assignee: Schaeffler KG, Herzogenaurach (DE)

( * ) Notice: Subject to any disclaimer, the term of this patent is extended or adjusted under 35 U.S.C. 154(b) by 269 days.

(21) Appl. No.: 10/548,509

(22) PCT Filed: Feb. 24, 2004

(86) PCT No.: PCT/EP2004/001781
§ 371 (c)(1),
(2), (4) Date: Sep. 6, 2005

(87) PCT Pub. No.: WO2004/079220
PCT Pub. Date: Sep. 16, 2004

(65) Prior Publication Data
US 2006/0090978 A1    May 4, 2006

(30) Foreign Application Priority Data
Mar. 8, 2003   (DE) ................................ 103 10 225

(51) Int. Cl.
*F16D 41/07*   (2006.01)
(52) U.S. Cl. ..................... 192/45.1; 192/41 A
(58) Field of Classification Search ............ None
See application file for complete search history.

(56) References Cited

U.S. PATENT DOCUMENTS

| | | | |
|---|---|---|---|
| 4,347,921 A * | 9/1982 | Bordes .................... 192/41 A |
| 4,875,564 A | 10/1989 | Leitz et al. | |
| 4,880,093 A * | 11/1989 | Message .................... 192/45.1 |
| 5,335,761 A | 8/1994 | Leitz | |
| 5,765,670 A * | 6/1998 | Fujiwara et al. ............ 192/45.1 |
| 2001/0030095 A1* | 10/2001 | Nagaya et al. ............. 192/45.1 |

FOREIGN PATENT DOCUMENTS

| | | |
|---|---|---|
| DE | 1142254 | 1/1963 |
| DE | 2027763 | 12/1970 |
| DE | 2446518 | 4/1975 |
| DE | 8012661 | 8/1980 |
| DE | 69614354 | 5/2002 |
| JP | 5-296266 | 9/1993 |
| JP | 09264342 | 10/1997 |

\* cited by examiner

*Primary Examiner*—Rodney H Bonck
(74) *Attorney, Agent, or Firm*—Lucas & Mercanti, LLP

(57) ABSTRACT

In an overrunning clutch comprising clamping elements (5) arranged behind one another in peripheral direction between a circular cylindrical inner ring (1) and a concentric outer ring (2), said clamping elements (5) being guided in pockets (6) of a cage (9) while being loaded by spring tongues (7) of a band spring (4) that bears radially against the cage (9), each of the pockets (6) for receiving a clamping element (5) comprising a limiting wall (8) that enables a support of the clamping element (5) on the cage (9), the cage (9) comprises a reinforcing ledge (10) formed integrally on an outer surface of the cage (9) in every radial region comprising the limiting wall (8).

4 Claims, 4 Drawing Sheets

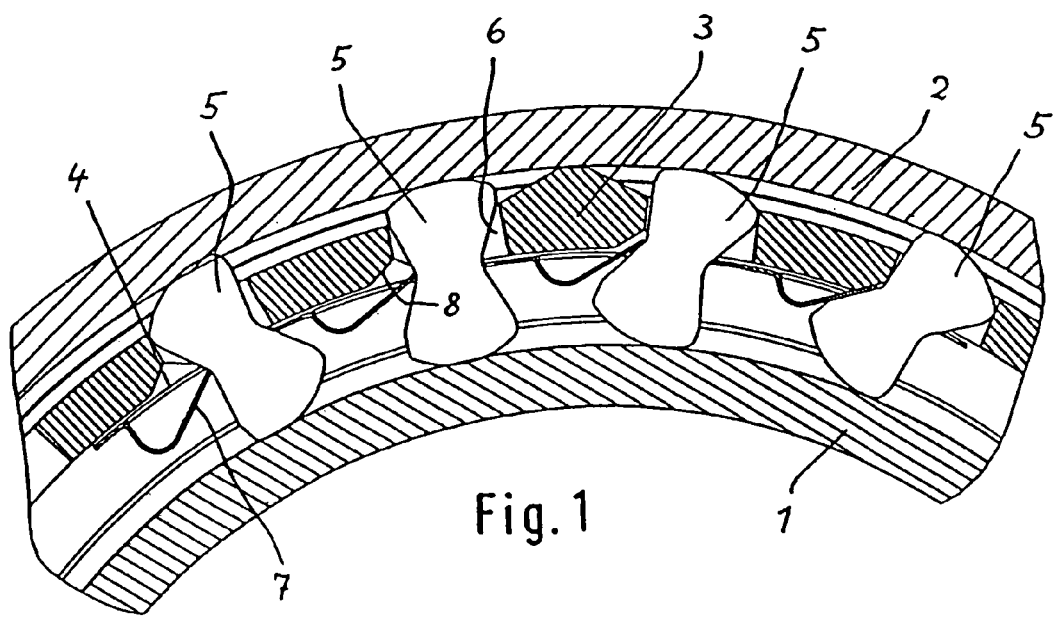
Fig. 1
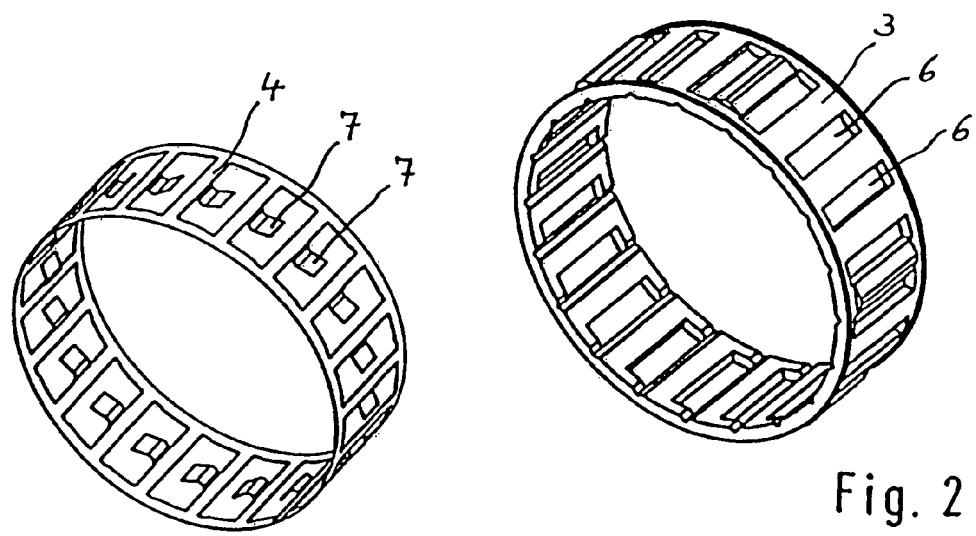
Fig. 2
Fig. 3
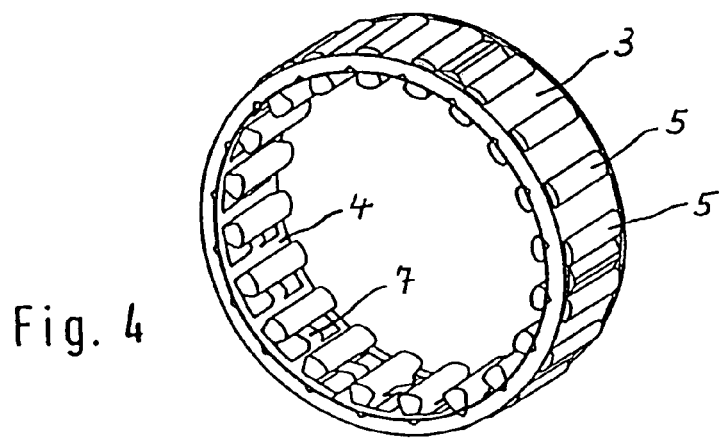
Fig. 4

OVERRUNNING CLUTCH

FIELD OF THE INVENTION

The invention concerns an overrunning clutch comprising clamping elements arranged behind one another in peripheral direction between a circular cylindrical inner ring and a concentric outer ring, said clamping elements being guided in pockets of a cage while being loaded by spring tongues of a band spring that bears radially against the cage.

BACKGROUND OF THE INVENTION

An overrunning clutch of the pre-cited type is known from the document DE 1 142 254 B. The band spring of this overrunning clutch is a punched, annularly bent resiliently yielding sheet metal strip on which the spring tongues are connected to cross webs through cross folds bent into a U-shape. In addition to the cross fold of each spring tongue, cross folds are also configured on both longitudinal webs that are connected to each other by the cross webs. These cross folds enhance the yielding behavior of the band spring but due to the fact that three cross folds are configured in the region of every spring tongue, the spring has a complex structural design.

Another overrunning clutch of the pre-cited type known from the document U.S. Pat. No. 5,335,761 further comprises, within each pocket receiving a clamping element, a limiting wall that enables a support of the clamping element on the cage. A pivoting of the clamping element causes a deflection of the spring tongue till it comes to bear through planar contact against the cage so that the clamping element then bears in face-to-face contact against the spring tongue and is supported through the spring tongue on the cage.

OBJECTS OF THE INVENTION

It is an object of the invention to provide an overrunning clutch comprising a cage that can be economically manufactured and a band spring that has a simple geometry. The clamping elements and the band spring of the overrunning clutch should be able to take a defined interlocked end position. It is intended to achieve a durable design through limited spring travel and permit the radial force applied by each clamping element to the cage to be transmitted from the cage to the outer ring.

These and other objects and advantages of the invention will become obvious from the following detailed description.

SUMMARY OF THE INVENTION

The invention achieves the above objects by the fact that the cage comprises a reinforcing ledge formed integrally on an outer surface of the cage in every radial region comprising the limiting wall. In this way, the cage is reinforced precisely at the point at which a radial force acts in outward direction due to the support of the clamping element on the cage. If, at the same time, the spring tongues abut against the cage, the overrunning clutch is capable of operating at maximum speed. For this planar support of the spring tongue on the limiting wall, each of the limiting wall, the spring tongue and the clamping element outer contour can be configured such that the centrifugal force of the clamping element is transmitted purely radially through the cage into the outer ring.

In the overrunning clutch of the invention, the cage pocket can limit the travel of the clamping element and the spring tongue, and this has a favorable effect on the operating life of the spring. The limiting feature can be configured as a radius or a bevel on the inner diameter of the cage. Through an exact guidance of the clamping elements in the cage and in the band spring, the vibration susceptibility of the overrunning clutch can be reduced.

The cage has a simple structural design and can be made without undercuts. The cage in FIG. 2 of the drawing comprises raised portions on both sides, so that the cage has a U-profile. The raised portions serve only to receive sliding washers. These can be simply slipped onto the cage and retained there by an interference fit. Or the cage may comprise an annular groove on each side and the sliding washers can be clipped into these grooves.

The band spring is a spring band comprising punched holes or simple cutouts made by laser machining. The suspension of the clamping elements, however, differs from the prior art of the document DE 1 142 254 B because the spring tongues are sprung more or less radially outwards from the clamping elements against the cage and the band spring does not experience any bending moments. In the delivery state of the assembly consisting of the cage, the band spring and the clamping elements, the spring tongues are practically free of pre-stress. Only for the retention of the clamping elements, these may be slightly pre-stressed. A noteworthy pre-stress is only developed when the assembly has been installed between the outer ring and the inner ring of the overrunning clutch.

As soon as a particular clamping element begins to clamp, its associated spring tongue relaxes little by little and is thus unloaded. This takes place as a result of the shape of the clamping body and because the band spring can move independently of the cage in peripheral direction. The clamping element is then retained between the inner and the outer ring solely by the clamping force, and this results in an optimization of the durability of the band spring.

The springing behavior can be adapted as required through the spring band thickness, and through the number, width and length of the spring tongues, as also through the contact contour on the cage. The band spring bears against the inner diameter of the cage and can rotate in peripheral direction independently of the cage. The joint ends of the spring band may be spot welded to each other in overlapping or abutting relationship, or the spring band may only be roller-burnished without a connection of any kind between the joint ends. The trimmed edges should point to the inner diameter so that the band spring does not hook into the cage during movement in peripheral direction. In axial direction, the band spring is retained by the clamping elements.

The limiting wall may be configured in the form of a bevel or in the form of a convex arched surface portion starting from the inner surface of the cage. This limiting wall can be arranged in a clearance in each pocket, the axial dimension of the clearance corresponding to the axial length of the spring tongue. In this way, the spring tongue does not necessarily require a bending geometry. The contacting faces of the limiting wall and the clamping element ideally have a mating shape.

Instead of being punched out, the steel band for the band spring may also be perforated by laser machining. This offers the advantage of a uniform quality of the cut edge. The wear of a cuffing tool that presently causes micro cracks on the work piece can have no effect in cutting by laser machining. A further advantage in addition to this is that springs of all sizes can be fabricated with the same equipment.

Examples of embodiment are illustrated in the drawing and will be described more closely below.

BRIEF DESCRIPTION OF THE DRAWING

FIG. 1 shows a partial cross-section through an overrunning clutch of a first embodiment of the invention;

FIG. 2 is a perspective view of a cage of the overrunning clutch of FIG. 1;

FIG. 3 is a perspective view of a band spring of the overrunning clutch of FIG. 1;

FIG. 4 is a perspective view of an assembled unit for the overrunning clutch comprising the cage, the inserted band spring and installed clamping elements;

DETAILED DESCRIPTION OF THE DRAWING

Figure 5:
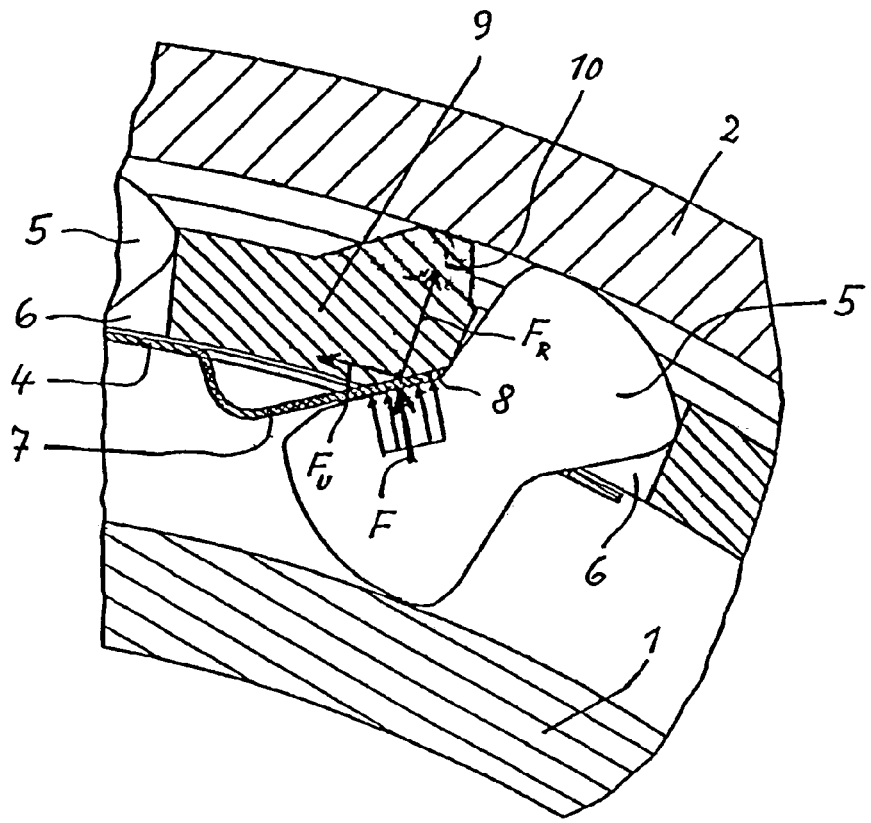
FIG. 5 shows a first modification of the overrunning clutch of FIG. 1.

An overrunning clutch shown in FIGS. 1 to 4 comprises a circular cylindrical inner ring 1, an outer ring 2 concentrically surrounding the inner ring 1 and, arranged in a space between the inner and the outer ring, an assembled unit comprising a cage 3, a band spring 4 and a plurality of clamping elements 5. The cage 3 comprises equi-spaced pockets 6 in peripheral direction for receiving the clamping elements 5.

The band spring 4 has an annular shape and is made out of a punched steel band. Corresponding to the pockets 6 of the cage 3, the band spring 4 comprises punched holes arranged behind one another in peripheral direction, a spring tongue 7 that is formed during the punching operation being arranged in each punched hole. The band spring 4 is dimensioned so as to be able to be inserted in axial direction into the cage 3 and bear against the inner surface of the cage 3. Upon insertion, the spring tongues 7 of the band spring 4 extend into the regions of the pockets 6 of the cage 3.

The clamping elements 5 can then be inserted in radial direction from the outside into the pockets 6 of the cage 3 and the punched holes of the band spring 4, and are then retained in peripheral direction of the cage 3 on one side by the spring tongues 7 and on the other side by webs of the band spring 4. According to one proposition of the invention, each pocket 6 for receiving a clamping element 5 comprises a limiting wall 8 in the form of a bevel that enables a face-to-face contact of the spring tongue 7 with the cage 3.

FIG. 1 shows the clamping elements 5 in four different positions that succeed each other during operation. The outermost clamping element 5 on the left is in the position of maximum clamping action between the inner ring 1 and the outer ring 2, while the outermost clamping element 5 on the right is in the lifted position and retains the adjoining spring tongue 7 of the band spring 4 against the limiting wall 8.

FIG. 5 illustrates an embodiment of the overrunning clutch in which a reinforcing ledge 10 is formed integrally on the outer surface of the cage 9 in the radial region of the cage 9 containing the limiting wall 8. This reinforcing ledge 10 enables the transmission of the radial component $F_R$ of the force F applied by the clamping element 5 to the cage 9 directly to the outer ring 2 because the limiting wall 8 configured as a bevel has an inclination such that the force F is divided into a peripheral component $F_U$ and a radial component $F_R$.

Figure 6:
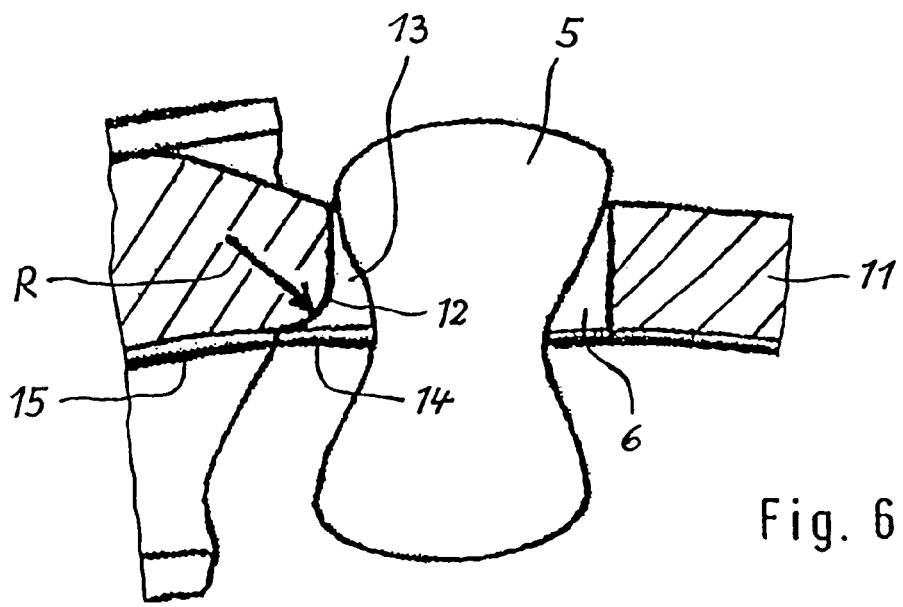
FIG. 6 shows a second modification of the overrunning clutch of FIG. 1.
Figure 7:
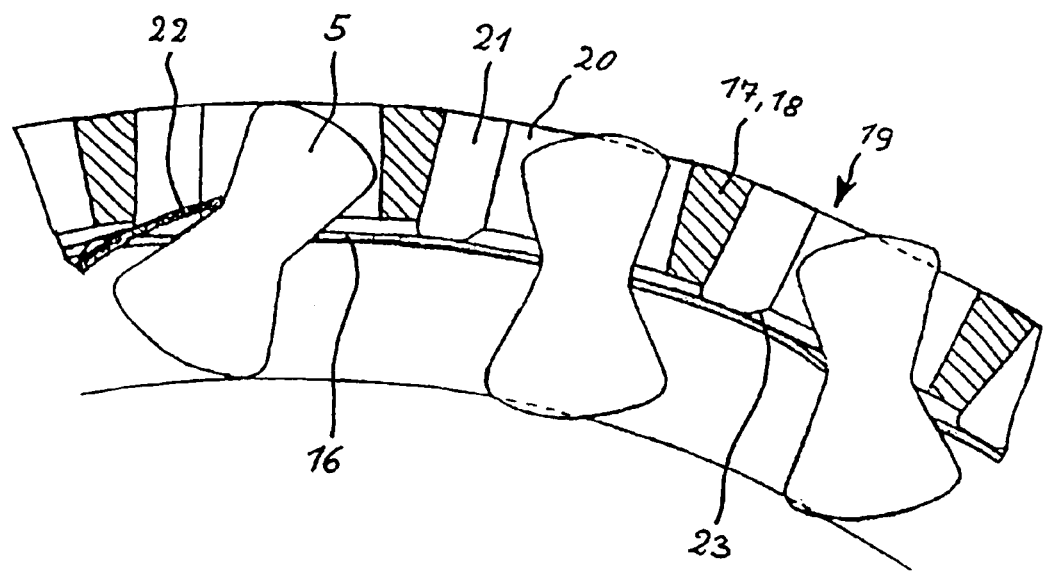
FIG. 7 is a partial view of a third modification of the overrunning clutch of FIG. 1 in which the clamping elements are not supported through the spring tongues but directly on the cage, three clamping elements being shown in different operational positions.
Figure 8:
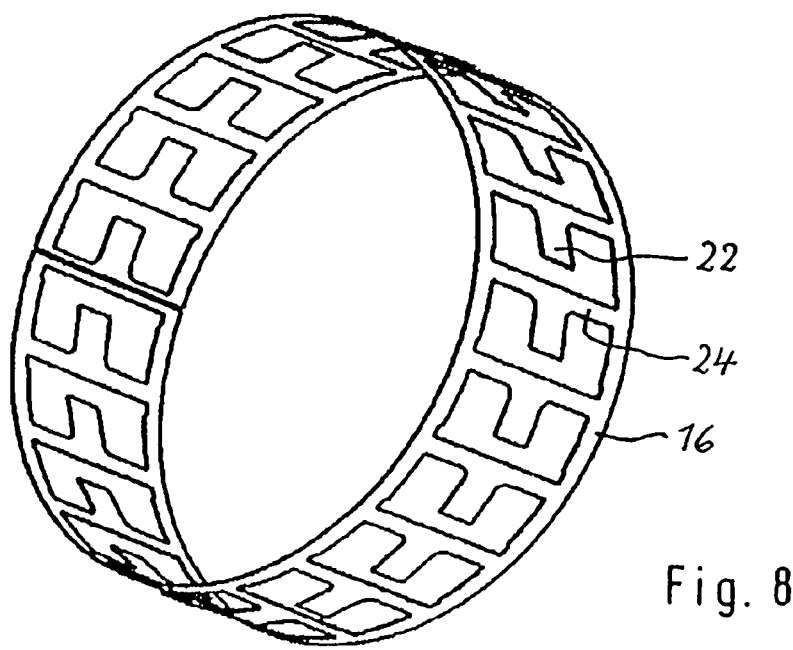
FIG. 8 is a perspective view of a band spring for an overrunning clutch of FIG. 7.
Figure 9:
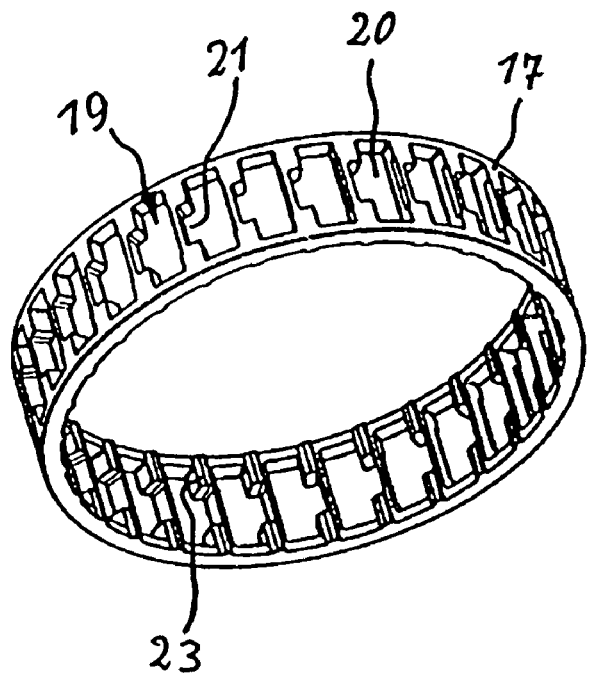
FIG. 9 is a perspective view of a cage for an overrunning clutch of FIG. 7.
Figure 10:
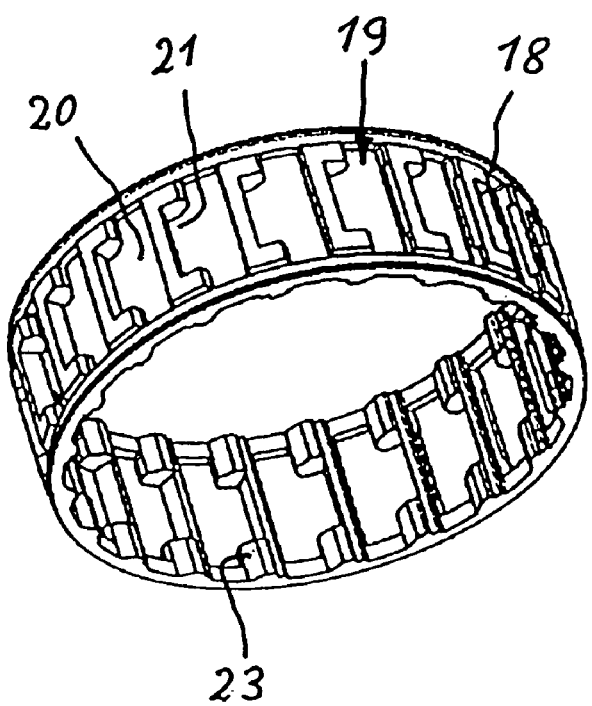
FIG. 10 is a perspective view of a further cage for an overrunning clutch of FIG. 7.

In the embodiment of the overrunning clutch illustrated in FIG. 6, a limiting wall 12 in the form of a convex arched surface portion starting from the inner surface of the cage 11 is arranged in every pocket 6. This arched portion is characterized by the radius R and defines a clearance 13 open towards the pocket 6 within the cage 11. The spring tongue 14 in this case does not require a bending geometry but rather extends in tangential direction of the band spring 15. When the clamping element 5 tilts, the spring tongue 14 can come to bear against the convex limiting wall 12 within the clearance 13.

In the general concept of an overrunning clutch shown in FIGS. 7 to 10, the clamping element geometry can be designed fully freely and can thus be absolutely optimized with regard to functionality. What is necessary is only that the clamping element have an exactly defined waist-line. This serves for an unambiguous positioning of the band spring 16 and the clamping element 5 in the cage 17 or 18 and is directed to the mounting feasibility of the clamping element 5 between the clamping tracks.

The material for the cage can be a glass fiber reinforced plastic as is already state of the art in the automobile branch. This has the advantage of low material costs as well as a favorable and economic manufacturing in large piece numbers with an injection mold. The rather high costs for such a mold are redeemed in the automotive field through the piece numbers and the operating life. A convincing argument for the use of a plastic is its small mass and the resulting low mass inertia. The glass fiber constituent enhances the strength and the wear resistance. Modern plastics are heat resistant up to 200° C. and possess very good chemical compatibility with common automobile oils. A low coefficient of friction relative to steel results in a positive wear and frictional behavior with regard to the clamping elements, the spring and the clamping tracks.

As viewed in radial direction, the cages 17 and 18 comprise T-shaped clearances. These so-called cage pockets 19 are uniformly distributed over the periphery and are made up of two sub-regions. The sub-region with the larger rectangular clearance 20 serves to receive the clamping elements 5 and for their symmetric distribution in peripheral direction. The clamping elements 5 are arranged axially parallel to one another and are guided in axial direction. They are configured such that their free movement is always possible. The sub region with the smaller rectangular clearance 21 permits an unimpeded and collision-free movement of the rigid tongues 22.

Limiting slopes 23 on the cage inner diameter form a positive end stop for each individual clamping element 5 for movement under the influence of centrifugal force when the clamping element 5 loses contact with the inner clamping track, for example, the clamping track on the inner ring 1. In this way, the lift-off travel of the clamping elements 5 is limited, so that, with decreasing centrifugal force due to the opposing suspension force, the clamping elements 5 regain a force-locked contact with the clamping track of the inner ring 1 as soon as possible. The spring excursion and the concomitant stresses in the band spring 16 are thus likewise limited.

The radial guidance of the band spring 16 that is slightly biased towards the outside is effected on the inner surface of the cage 17, 18 at the smallest diameter of the cage. At the same time, this surface prevents a widening of the open band spring under the influence of centrifugal force because its joint ends are not connected to each other. Cage rims prevent an axial projection of the band spring 16 out of the cage 17, 18 as well as an axial contact between the clamping elements 5 and any sliding washers that may be disposed on the cage if this is necessary.

The entire cage is guided on the outside i.e., the clearance between the outer diameter of the cage and the outer clamping track, viz., the inner surface of the outer ring 2 is configured as small as possible with due consideration to the different coefficients of thermal expansion. In this way, in the ideal case, the radial component of the centrifugal force acting on the clamping elements 5 can be transmitted directly to the outer clamping track. This results in a load relief on the cage. The friction between the cage and the outer clamping track that is thus increased under the influence of the centrifugal force promotes the positive rotation of the clamping elements and the cage at the speed of rotation of the outer clamping track.

If it is necessary to arrange one or two sliding washers on the cage, a circumferential groove may be configured on one or on both sides of the cage. Such grooves enable a rotation-free and transportation-safe reception of axially snapped-on sliding washers. Snapping-on is effected through fractional beads on the sliding washers. The outer guidance of the cage is achieved through radial elevations on the cage outer diameter in the region of the cage webs above the limiting slopes 23.

The described cage structure has a symmetric geometry. The clamping direction of the overrunning clutch can be indicated by a marking on the cage or a legend on the sliding washer.

The band spring 16 is made of a one-piece spring steel band for the individual suspension of each clamping element. The geometry is simple, unidimensional and linear without any kind of bends. The only possible setting behavior is the widening of the spring band but this is prevented by the guidance on the cage inner diameter. The band can be fabricated as a simple punched or laser-cut part.

The entire spring band is uniformly roller burnished including the spring tongues 22. In this way, uniform suspension properties are obtained in the assembled state for the first and the last clamping element and for all the clamping elements situated therebetween. The spring band is inserted with a slight radial bias into the cage and is positioned concentrically in a defined manner by this.

The clearance between the spring tongue 22 and the spring web 24 in which the clamping element 5 is received for safe transportation and retained in an axially parallel position must correspond at least to the narrowest part of the clamping element 5 (waist-line). It is only in this way that a free and smooth movement of the clamping element in the spring pocket is assured, particularly each time the rigid spring tongue 22 traverses its zero position i.e., when the direction of the suspension force changes from radially outwards to radially inwards, and vice versa.

For the transportation of the overrunning clutch, this clearance is situated exactly at the waist-line of the clamping element, which means that the cage inner diameter must naturally be adequately dimensioned. The suspension thus becomes effective only after mounting in the surrounding components. The clamping elements are suspended in such a way that, at the beginning of torque take-up, the friction-locking of the clamping elements with the clamping tracks and, at the same time, the rolling-in movement of the clamping elements resulting from the torque is assisted and, in the course of torque build-up, the suspension force changes its direction when passing though the zero position. After this, it assists the disengagement of the clamping element when the torque decreases again. Thus, at high loading frequencies, this type of suspension acts in opposition to the clamping element inertia.

The spring tongue 22 subjected to bend loading is so rigid compared to the torsion-loaded spring web 24 that the spring effect results solely from the torsion of the spring webs 24. The spring tongue and the spring edge undergo no elastic deformation due to the suspension. For this reason, the cage must be cleared in the region of the spring webs 24.

The invention claimed is:

1. An overrunning clutch comprising clamping elements arranged behind one another in peripheral direction between a circular cylindrical inner ring and a concentric outer ring, said clamping elements being guided in pockets of a cage while being loaded by spring tongues of a band spring that bears radially against the cage, each of the pockets for receiving a clamping element comprising a limiting wall that enables a support of the clamping element on the cage, a reinforcing ledge formed integrally on an outer surface of the cage in every radial region delimited by the limiting wall, the reinforcing ledge being proximately aligned radial outward of the limiting wall, the reinforcing ledge being in contact with the outer ring in such a way that a radial force applied by the clamping elements to the limiting wall is conveyed through the reinforcing ledge to the outer ring, wherein the clamping elements are suspended in such a way that, at the beginning of torque take-up, a friction-locking of the clamping elements with a clamping track and, at the same time, the rolling-in movement of the clamping elements resulting from the torque is assisted and, in the course of torque build-up, a suspension force changes direction when passing through a zero position.

2. An overrunning clutch of claim 1, wherein the limiting wall is a bevel starting from an inner surface of the cage.

3. An overrunning clutch of claim 1, wherein the limiting wall is a convexly arched surface portion starting from an inner surface of the cage.

4. An overrunning clutch of claim 1, wherein the limiting wall is arranged within a clearance in every pocket, an axial dimension of the clearance corresponding to an axial length of the spring tongue.

* * * * *